US011262752B2

(12) United States Patent
Mori

(10) Patent No.: US 11,262,752 B2
(45) Date of Patent: Mar. 1, 2022

(54) VEHICLE CONTROLLER AND COMPUTER-READABLE STORAGE MEDIUM

(71) Applicant: HONDA MOTOR CO.,LTD., Tokyo (JP)

(72) Inventor: Takashi Mori, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 16/395,229

(22) Filed: Apr. 25, 2019

(65) Prior Publication Data

US 2019/0339696 A1    Nov. 7, 2019

(30) Foreign Application Priority Data

May 2, 2018   (JP) .............................. JP2018-088824

(51) Int. Cl.
  *G05D 1/00*  (2006.01)
  *B60W 50/08*  (2020.01)
(52) U.S. Cl.
  CPC ......... *G05D 1/0061* (2013.01); *B60W 50/082* (2013.01); *G05D 1/0022* (2013.01); *B60W 2540/10* (2013.01); *B60W 2540/12* (2013.01); *B60W 2540/18* (2013.01); *G05D 2201/0213* (2013.01)
(58) Field of Classification Search
  CPC .............. G05D 1/0061; G05D 1/0022; G05D 2201/0213; G05D 1/0038; B60W 50/082; B60W 2540/12; B60W 2540/18; B60W 2540/10
  See application file for complete search history.

(56) References Cited

U.S. PATENT DOCUMENTS

| 8,498,958 B2 * | 7/2013 | Inoue .................... G01S 13/931 706/54 |
| 10,133,270 B2 * | 11/2018 | Michalakis ........... B60W 10/20 |

(Continued)

FOREIGN PATENT DOCUMENTS

| JP | H03282713 A | 12/1991 |
| JP | 2000311299 A | 11/2000 |

(Continued)

OTHER PUBLICATIONS

Office Action issued for counterpart Japanese Application No. 2018-088824, issued by the Japanese Patent Office dated Oct. 5, 2021 (drafted on Oct. 1, 2021).

*Primary Examiner* — Frederick M Brushaber

(57) ABSTRACT

A vehicle controller that controls a vehicle having a first driving mode in which the vehicle travels according to a first control signal based on manual driving or automated driving, and has a second driving mode in which the vehicle travels according to the second control signal based on remote driving is provided, the vehicle controller including a signal comparing unit that compares, to a first control signal, a second control signal acquired by a second control signal acquiring unit while a vehicle control unit is controlling the travelling of the vehicle according to the first control signal, and a mode control unit that causes the vehicle to exit the first driving mode and enter the second driving mode when a comparison result by a signal comparing unit satisfies a predetermined condition.

19 Claims, 10 Drawing Sheets

(56) References Cited

U.S. PATENT DOCUMENTS

| | | | | |
|---|---|---|---|---|
| 10,845,796 B2* | 11/2020 | Michalakis | ............ | B60W 10/04 |
| 2014/0095016 A1* | 4/2014 | Suganuma | ............... | G07C 5/00 |
| | | | | 701/32.1 |
| 2015/0367887 A1* | 12/2015 | Fujita | .................. | B62D 15/021 |
| | | | | 701/41 |
| 2017/0212512 A1 | 7/2017 | Schmid | | |
| 2018/0284759 A1* | 10/2018 | Michalakis | ............ | B60W 30/16 |
| 2019/0049941 A1* | 2/2019 | Michalakis | ......... | B60W 50/082 |
| 2019/0204830 A1 | 7/2019 | Ogura | | |

FOREIGN PATENT DOCUMENTS

| | | | |
|---|---|---|---|
| JP | 2003205762 A | | 7/2003 |
| JP | 2004206218 A | | 7/2004 |
| JP | 2017522668 A | | 8/2017 |
| JP | 2018062223 A | | 4/2018 |

\* cited by examiner

VEHICLE CONTROLLER AND COMPUTER-READABLE STORAGE MEDIUM

The contents of the following Japanese patent application are incorporated herein by reference: NO. 2018-088824 filed in JP on May 2, 2018.

BACKGROUND

1. Technical Field

The present invention relates a vehicle controller and a computer-readable storage medium.

2. Related Art

A technology to remotely drive a vehicle by an electric vehicle and/or remotely drive a vehicle by a remote driving apparatus for remote driving has been known (for example, refer to Patent Documents 1 and 2).

PRIOR ART LITERATURE

Patent Document

[Patent Document 1] Japanese Patent Application Publication No. 2000-311299
[Patent Document 2] Japanese Patent Application Publication No. 2004-206218

SUMMARY

It is desirable to provide a technology that can achieve remote driving that is suitable for an occupant of a remote-driving target vehicle.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
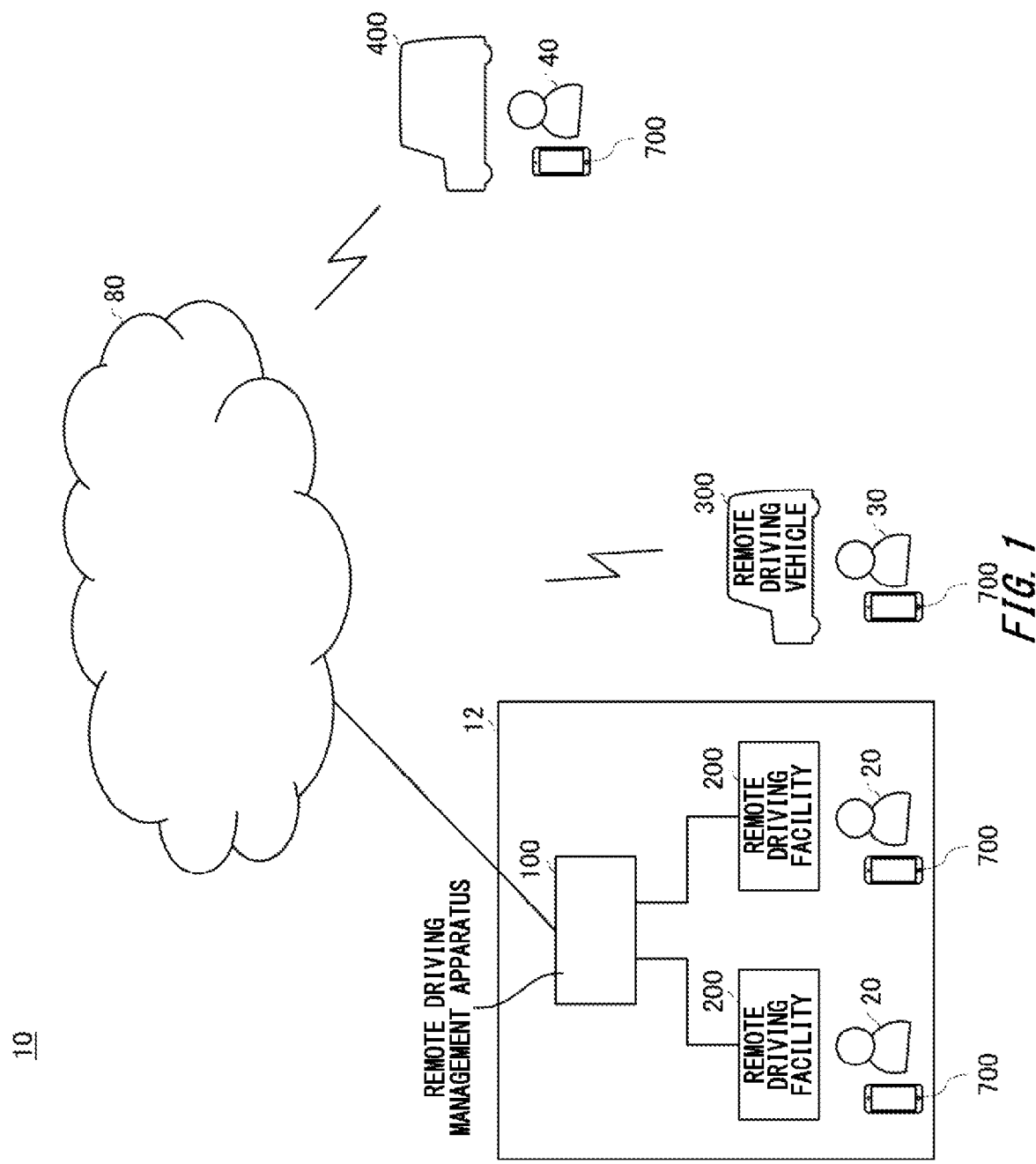
FIG. 1 schematically shows one example of a remote driving system 10.

FIG. 1 schematically shows one example of a remote driving system 10. The remote driving system 10 includes a remote driving management center 12, a remote driving vehicle 300 and a vehicle 400. Although one remote driving vehicle 300 is shown in FIG. 1, the number of the remote driving vehicles 300 may also be more than one. Also, although one vehicle 400 is shown in FIG. 1, the number of the vehicles 400 may also be more than one. The remote driving management center 12 includes a remote driving management apparatus 100 and a plurality of remote driving facilities 200. Although two remote driving facilities 200 are shown in FIG. 1, the number of the remote driving facilities 200 may also be three or more.

The remote driving facility 200 is a facility for remotely driving the vehicle 400 via a network 80. The network 80 may be any network, and for example, may include at least any one of Internet, a mobile phone network, such as so-called 3rd Generation (3G), Long Term Evolution (LTE), 4th Generation (4G) and 5th Generation (5G), Public Wireless Local Area Network (LAN) and a dedicated network.

The remote driving facility 200 is a facility in which a driver seat of a motor vehicle is mocked, for example. The remote driving facility 200 has a manipulating unit that receives a manipulation by a driver 20 who remotely drives the vehicle 400, and a communication unit that sends, to the vehicle 400, a signal corresponding to the manipulation to the manipulating unit. The remote driving facility 200 is one example of a remote driving apparatus. The driver 20 is one example of a remote driver. The manipulating unit includes manipulating members required for operations of a vehicle, such as a steering wheel, an accelerator pedal, a brake pedal, a shift lever and a blinker lever. Also, the manipulating unit may also further include a manipulating member for manipulating equipment such as car navigation system, an air conditioner, an audio, a slide door, a sunroof and a seat heater. The communication unit receives an image of a surrounding area of the vehicle 400 captured by an image capturing unit included in the vehicle 400. The remote driving facility 200 has a display unit that displays the image of the surrounding area of the vehicle 400 received by the communication unit. The driver 20 manipulates the manipulating unit while viewing the image displayed by the display unit, thereby achieving remote driving of the vehicle 400.

The remote driving vehicle 300 is a motor vehicle that has a remote driving function to remotely drive the vehicle 400 via the network 80. The remote driving vehicle 300 may be a vehicle on which manual driving can be performed. The manual driving means driving a vehicle by manipulating a manipulating unit included in the vehicle. Also, the remote driving vehicle 300 may also be a vehicle on which so-called automated driving can be performed.

The remote driving vehicle 300 has a manipulating unit that receives a manipulation by a driver 30, and a communication unit that communicates with the vehicle 400 and the remote driving management apparatus 100. The remote driving vehicle 300 is one example of a remote driving apparatus. The driver 30 is one example of a remote driver. The manipulating unit includes manipulating members required for operations of a vehicle, such as a steering wheel, an accelerator pedal, a brake pedal, a shift lever and a blinker lever. Also, the manipulating unit may further include a manipulating member for manipulating equipment such as an air conditioner, an audio, a car navigation system, a slide door, a sunroof and a seat heater. The communication unit receives an image of a surrounding area of the vehicle 400 image captured by an image capturing unit included in the vehicle 400. The remote driving vehicle 300 has a display unit that displays the image of the surrounding area of the vehicle 400 received by the communication unit. The remote driving vehicle 300 has a manual driving mode and a remote driving mode, for example, and travels according to a manipulation to the manipulating unit when in the manual driving mode, and sends, to the vehicle 400, a signal corresponding to the manipulation to the manipulating unit when in the remote driving mode. For example, the driver 30 can remotely drive the vehicle 400 by causing the remote driving vehicle 300 that is parked in a parking space of the driver's home to be switched to the remote driving mode.

The vehicle 400 is a motor vehicle that can be remotely driven by the remote driving facility 200 or the remote driving vehicle 300. In addition to being able to be remotely driven, the vehicle 400 can be manually driven. Also, the vehicle 400 may be a vehicle on which automated driving can be performed. The vehicle 400 may have a remotely driven mode in which the vehicle 400 travels according to a control signal based on the remote driving, a manual driving mode in which the vehicle 400 travels according to a control signal based on the manual driving and an automated driving mode in which the vehicle 400 travels according to a control signal based on the automated driving. The manual driving mode may be one example of a first driving mode. The automated driving mode may be one example of the first driving mode. The remotely driven mode may be one example of a second driving mode.

When in the automated driving mode, the vehicle 400 performs travelling, stopping, turning and the like of itself by using the image capturing unit and an apparatus such as a radar that are provided to the vehicle 400, location information and map information without steering, accelerator pedal manipulation, brake pedal manipulation, gear change manipulation, and the like by the driver. When in the remotely driven mode, the vehicle 400 performs travelling, stopping and turning and the like according to a control signal received from the remote driving facility 200 or the remote driving vehicle 300.

The remote driving management apparatus 100 provides a remote driving service to a plurality of vehicles 400. The remote driving management apparatus 100 may provide the remote driving service to the vehicle 400 that has been registered in the service. The remote driving management apparatus 100 may store registration data of a plurality of vehicles 400. The registration data of the vehicles 400 include vehicle information of each of the plurality of vehicles 400. The vehicle information may include identification information, a vehicle type, a vehicle name and the like of the vehicle 400.

The remote driving management apparatus 100 may store registration data of a plurality of remote drivers. The registration data of remote drivers may include identification information to identify a remote driver, identification information to identify a remote driving apparatus corresponding to the remote driver, identification information to identify a communication terminal 700 of the remote driver and a remote-driving permissible time. The communication terminal 700 may be a mobile phone such as a smart phone, a tablet terminal, Personal Computer (PC) and the like.

The remote-driving permissible time is a time at which the remote driver can remotely drive the vehicle 400, and for example, is registered by the remote driver. The driver 20 may register the remote-driving permissible time in the remote driving management apparatus 100 via the remote driving facility 200. Also, the driver 30 may register the remote-driving permissible time in the remote driving management apparatus 100 via the remote driving vehicle 300. Also, the remote driver may also register the remote-driving permissible time in the remote driving management apparatus 100 via the network 80 by using the communication terminal 700.

When receiving requirement information to require the remote driving of the vehicle 400, the remote driving management apparatus 100 refers to the registration data of the remote driver to determine the remote driver who is to perform the remote driving on the vehicle 400. The remote driving management apparatus 100 receives the requirement information to require the remote driving of the vehicle 400, which is sent by an occupant 40 of the vehicle 400, for example. The occupant 40 sends the requirement information from the vehicle 400 to the remote driving management apparatus 100, for example. Also, the occupant 40 sends the requirement information from the communication terminal 700 owned by the occupant 40 to the remote driving management apparatus 100, for example.

The requirement information includes identification information to identify the vehicle 400. The requirement information may include section information that indicates a travelling section in which the vehicle 400 travels by remote driving. The requirement information may include location information that indicates a location of the vehicle 400. The requirement information may include time information that indicates a time at which the remote driving of the vehicle 400 is desired.

When the occupant 40 of the vehicle 400 desires to perform remote driving from his/her home to a destination, for example, the occupant 40 sends, to the remote driving management apparatus 100, requirement information that includes the section information that indicates a travelling section from his/her home to the destination, and time information that is determined based on departure time and required time from his/her home to the destination. The required time from his/her home to the destination may be set by the occupant 40, may also be set by the communication terminal 700 owned by the occupant 40, and may also be set by the navigation apparatus included in the vehicle 400.

Also, for example, when the occupant 40 of the vehicle 400 is to move the vehicle 400 on a path to the destination by manual driving, if the remote driving within a partial section of the path is desired, the occupant 40 of the vehicle 400 sends, to the remote driving management apparatus 100, requirement information including section information that indicates the section and time information that indicates time at which the vehicle 400 travels on the section.

Also, for example, when the vehicle 400 is moved to the destination by automated driving, if a remote driving section that is a section on which the vehicle 400 travels by remote driving is included within the movement path, the vehicle 400 sends, to the remote driving management apparatus 100, requirement information including section information that indicates the section and time information that indicates time at which the vehicle 400 travels the section. The remote driving section is, for example, a section on which the automated driving is not permissible, a section on which the automated driving is prohibited, a section on which the automated driving is not proper and the like.

The remote driving management apparatus 100 requests the determined remote driver to remotely drive the vehicle 400. For example, the remote driving management apparatus 100 sends the request information including the section information and the time information to the communication terminal 700 owned by the determined remote driver, and a remote driving apparatus corresponding to the determined remote driver. The remote driver who has received the request uses the remote driving apparatus to remotely drive the vehicle 400. The remote driver causes the vehicle 400 to travel by remote driving on a travelling section indicated by the section information within the time indicated by the time information.

Here, when a driving style of the occupant 40 of the vehicle 400 is different from a driving style of the remote driver, the occupant 40 may feel discomfort. For example, when the occupant 40 tends to gently decelerate the vehicle but the remote driver tends to rapidly decelerate the vehicle, the occupant 40 may feel that the vehicle 400 travels roughly by the remote driving. Also, for example, when the occupant 40 usually performs automated driving on the vehicle 400, if the driving style when automated driving is different from the driving style of the remote driver, the occupant 40 may also feel discomfort.

For example, when the vehicle 400 according to the present embodiment is to be switched from the manual driving to the remote driving, the vehicle 400 is not immediately switched to the remote driving even if receiving a control signal based on the remote driving from the remote driving apparatus. The vehicle 400 compares the control signal based on the manual driving to the control signal based on the remote driving in a certain period, and when the comparison result satisfies a condition, the vehicle 400 is switched to the remote driving. On the contrary, when the comparison result does not satisfy the condition, the vehicle 400 is not switched to the remote driving and requires the remote driving management apparatus 100 for changing the remote driver. Accordingly, a remote driver who has a similar driving style to the driving style of the occupant 40 can perform remote driving on the vehicle 400, and the possibility that the occupant 40 feels discomfort due to the difference in the driving styles can be reduced.

Figure 2:
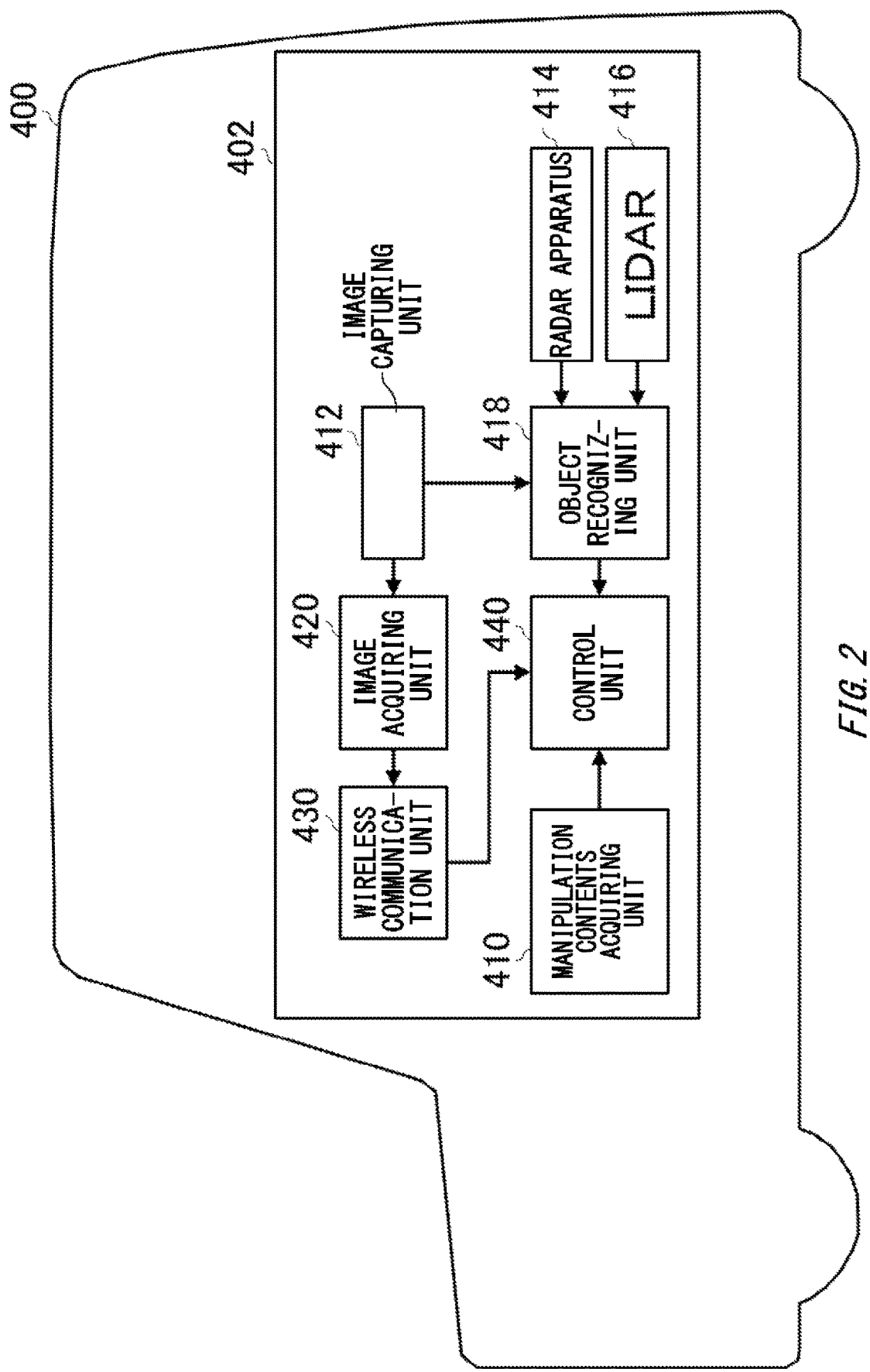
FIG. 2 schematically shows one example of a functional configuration of a vehicle 400.

FIG. 2 schematically shows one example of a functional configuration of a vehicle controller 402 included in the vehicle 400. The vehicle controller 402 includes a manipulation contents acquiring unit 410, an image capturing unit 412, a radar apparatus 414, a Light Detection and Ranging (LIDAR) 416, an object recognizing unit 418, an image acquiring unit 420, a wireless communication unit 430 and a control unit 440. Note that the vehicle controller 402 does not necessarily include all of these components.

The manipulation contents acquiring unit 410 acquires manipulation contents to the manipulating unit included in the vehicle 400. For example, the manipulation contents acquiring unit 410 acquires the steering angle of steering, a stepping operation amount of an accelerator pedal, a stepping operation amount of a brake pedal and the like.

The image capturing unit 412 is a digital camera utilizing a solid-state image capturing device such as a Charge Coupled Device (CCD) or a Complementary Metal Oxide Semiconductor (CMOS), for example. One or more of image capturing units 412 are mounted on an arbitrary position of the vehicle 400. When capturing an image of the front of the vehicle 400, the image capturing unit 412 is mounted on an upper portion of a front windshield, a back surface of a room mirror or the like. When a plurality of image capturing units 412 are mounted thereon, the plurality of image capturing units 412 may capture images in different directions. The image capturing units 412 periodically and repeatedly capture images of a surrounding area of the vehicle 400, for example. The image capturing unit 412 may also be a stereo camera.

The radar apparatus 414 radiates a radio wave such as a millimeter wave to the surrounding area of the vehicle 400 and detects a radio wave (reflected wave) reflected by an object to detect at least a location (a distance and a direction) of the object. One or more radar apparatuses 414 are mounted on an arbitrary position of the vehicle 400. The radar apparatus 414 may also detect a location and a speed of an object by the Frequency Modulated Continuous Wave (FM-CW) scheme.

The LIDAR 416 irradiates light of the surrounding area of the vehicle 400 to measure scattered light. The LIDAR 416 detects a distance to a target based on a period of time from emission of light to reception of the light. The irradiated light is pulse laser light, for example. One or more LIDARs 416 are mounted on an arbitrary position of the vehicle 400.

The object recognizing unit 418 recognizes a location, a type, a speed and the like of an object based on a detection result by some or all of the image capturing unit 412, the radar apparatus 414 and the LIDAR 416. The object recognizing unit 418 outputs the recognition result to the control unit 440. Also, the object recognizing unit 418 may output, to the control unit 440, the detection results by the image capturing unit 412, the radar apparatus 414 and the LIDAR 416 as they are if required.

The image acquiring unit 420 acquires an image captured by the image capturing unit 412. The wireless communication unit 430 performs wireless communication with the remote driving management apparatus 100, the remote driving facility 200 and the remote driving vehicle 300 via the network 80. When the vehicle 400 is in the remotely driven mode, the wireless communication unit 430 sends the image acquired by the image acquiring unit 420 to the remote driving management apparatus 100, the remote driving facility 200 or the remote driving vehicle 300. Also, when the vehicle 400 is in the remotely driven mode, the wireless communication unit 430 receives a control signal based on the remote driving from the remote driving management apparatus 100, the remote driving facility 200 or the remote driving vehicle 300 and outputs the control signal to the control unit 440.

The control unit 440 controls the vehicle 400. The control unit 440 may have a location acquiring unit that acquires a location of the vehicle 400. The location acquiring unit receives the location information of the vehicle 400 from a navigation apparatus included in the vehicle 400, for example. The navigation apparatus of the vehicle 400 has a Global Navigation Satellite System (GNSS) receiver, for example, and the GNSS receiver identifies the location of the vehicle 400 based on a signal received from a GNSS satellite. Note that the location acquiring unit may also have the GNSS receiver.

The control unit 440 may acquire destination information that indicates a destination of the vehicle 400, and path information that indicates a movement path to the destination. The control unit 440 acquires the destination information and the path information from the navigation apparatus included in the vehicle 400, for example.

The control unit 440 acquires at least first map information including map information of the movement path indicated by the path information. The control unit 440 receives the first map information from the navigation apparatus of the vehicle 400, for example. Also, the control unit 440 may also receive the first map information via the network 80 from a map management server that manages map information of various places. The first map information is information in which shapes of roads are represented by links that shows the roads and by nodes that are connected by the links, for example. The first map information may also include road curvature, Point Of Interest (POI) information or the like. The first map information may be updated at any time.

The control unit 440 may also further acquire at least second map information including map information of the movement path indicated by the path information. Similar to the first map information, the control unit 440 may receive the second map information from the navigation apparatus of the vehicle 400 or receive the second map information via the network 80. The second map information is map information with higher precision than the first map information. The second map information includes, for example, information of a center of a lane, information of boundary between lanes or the like. Also, the second map information may include road information, traffic regulation information and the like. The second map information may be updated at any time.

When the vehicle 400 is in the automated driving mode, the control unit 440 may control the travelling of the vehicle 400 by using the location acquired by the location acquiring unit, the information received from the object recognizing unit 418 and the first map information. The control unit 440 may control the travelling of the vehicle 400 by further using the second map information. When the vehicle 400 is in the manual driving mode, the control unit 440 may control the travelling of the vehicle 400 according to the manipulation contents acquired by the manipulation contents acquiring unit 410.

When the vehicle 400 is in the remotely driven mode, the control unit 440 controls the travelling of the vehicle 400 according to the control signal received by the wireless communication unit 430 from the remote driving management apparatus 100, the remote driving facility 200 or the remote driving vehicle 300.

Figure 3:
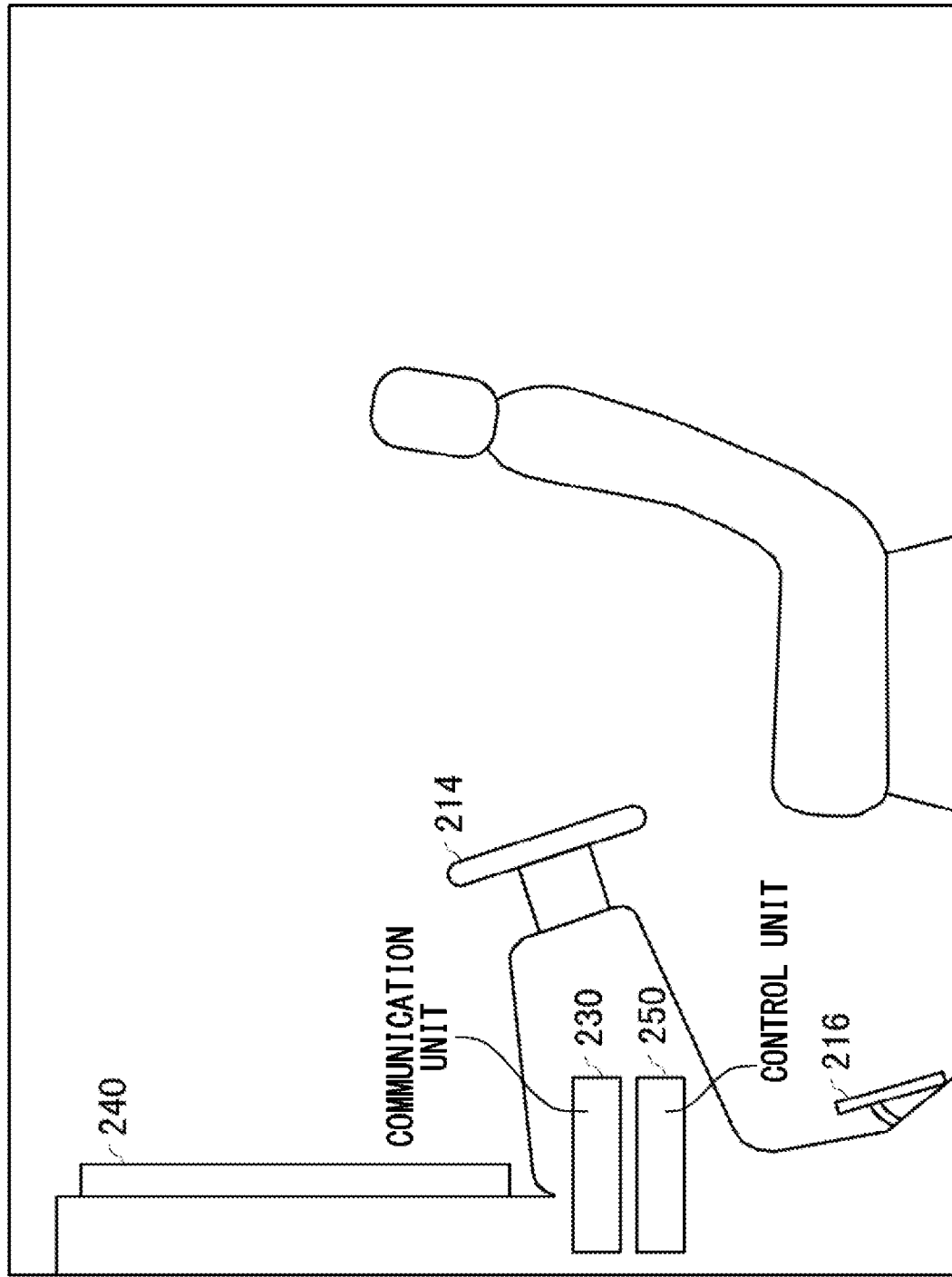
FIG. 3 schematically shows one example of a remote driving facility 200.

FIG. 3 schematically shows one example of the remote driving facility 200. In FIG. 3, the illustrations of manipulating members excluding the steering wheel 214 and the pedal 216 are omitted.

The remote driving facility 200 includes a communication unit 230, a display unit 240 and a control unit 250. The communication unit 230 performs communication with the remote driving management apparatus 100. Also, the communication unit 230 performs communication with the vehicle 400. The communication unit 230 may perform communication with the vehicle 400 via the remote driving management apparatus 100. Also, the communication unit 230 may also perform communication with the vehicle 400 via the network 80 without using the remote driving management apparatus 100.

The communication unit 230 receives an image sent by the wireless communication unit 430 of the vehicle 400. The display unit 240 displays the image received by the communication unit 230 from the vehicle 400. Note that the remote driving facility 200 may also include, instead of the display unit 240, a projector and a screen, and in this case, the projector may project an image received by the communication unit 230 on the screen.

The control unit 250 acquires manipulation contents to the manipulating member of the remote driving facility 200 and causes the communication unit 230 to send a signal that indicates the manipulation contents to the vehicle 400. The control unit 250 causes the communication unit 230 to send the steering angle of steering and a stepping operation amount of the pedal 216 and the like, for example.

Figure 4:
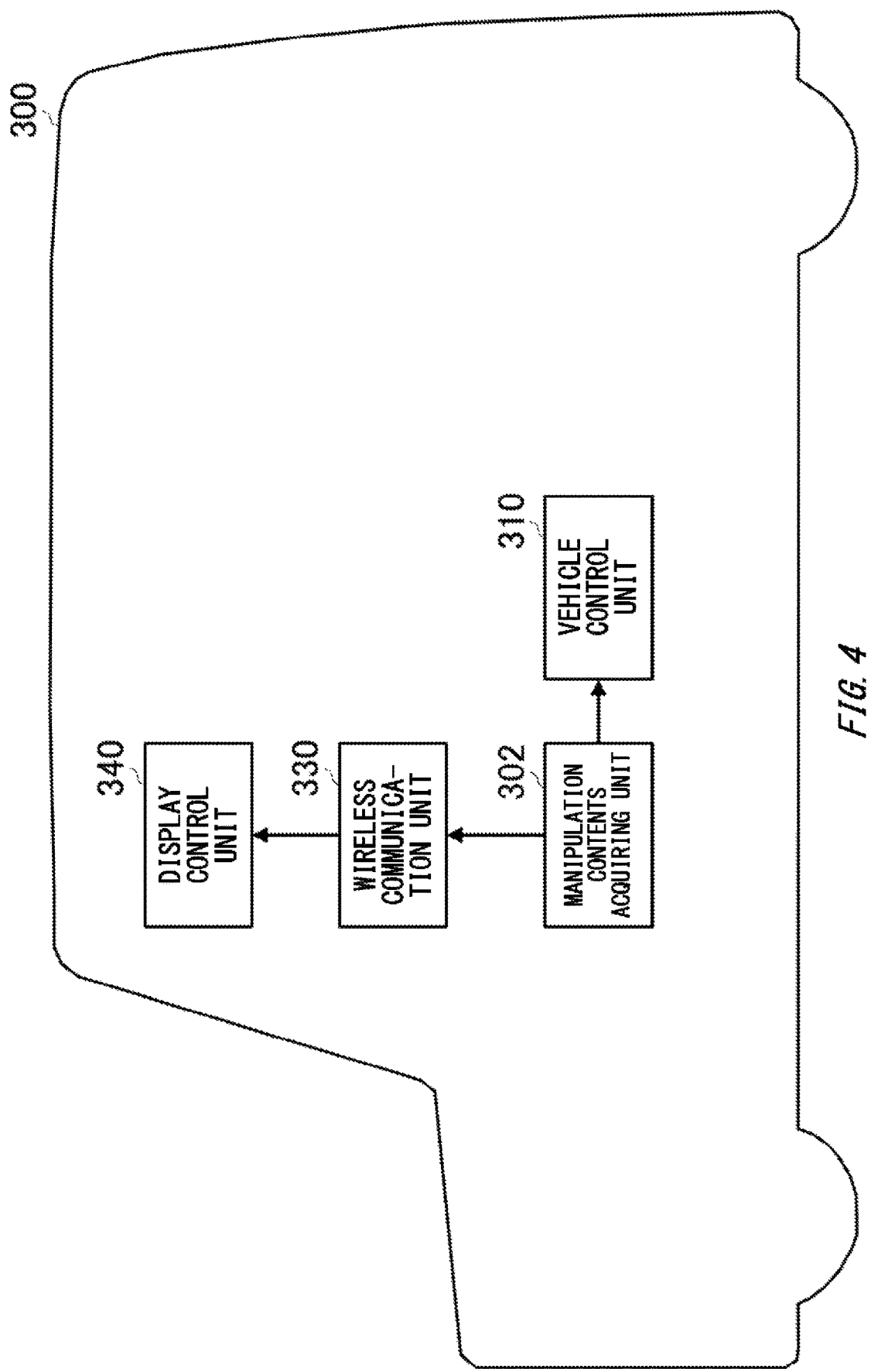
FIG. 4 schematically shows one example of a functional configuration of a remote driving vehicle 300.

FIG. 4 schematically shows one example of a functional configuration of the remote driving vehicle 300. The remote driving vehicle 300 includes a manipulation contents acquiring unit 302, a vehicle control unit 310, a wireless communication unit 330 and a display control unit 340.

The manipulation contents acquiring unit 302 acquires the manipulation contents to the manipulating unit included in the remote driving vehicle 300. For example, the manipulation contents acquiring unit 302 acquires the steering angle of steering, the stepping operation amount of the accelerator pedal, the stepping operation amount of the brake pedal and the like.

When the remote driving vehicle 300 is in the manual driving mode, the manipulation contents acquiring unit 302 outputs a signal that indicates the acquired manipulation contents to the vehicle control unit 310. The vehicle control unit 310 controls the remote driving vehicle 300 according to the signal acquired from the manipulation contents acquiring unit 302.

When the remote driving vehicle 300 is in the remote driving mode, the manipulation contents acquiring unit 302 outputs the acquired manipulation contents to the wireless communication unit 330. The wireless communication unit 330 sends the signal acquired from the manipulation contents acquiring unit 302 to the vehicle 400 via the network 80.

When the remote driving vehicle 300 is in the remote driving mode, the wireless communication unit 330 receives an image sent by the wireless communication unit 430 of the vehicle 400 and outputs the image to the display control unit 340. The display control unit 340 displays the received image on a display unit included in the remote driving vehicle 300.

When the automated driving can be performed on the remote driving vehicle 300, the remote driving vehicle 300 may further include a similar configuration to the image capturing unit 412, the radar apparatus 414 the LIDAR 416 and the object recognizing unit 418.

Figure 5:
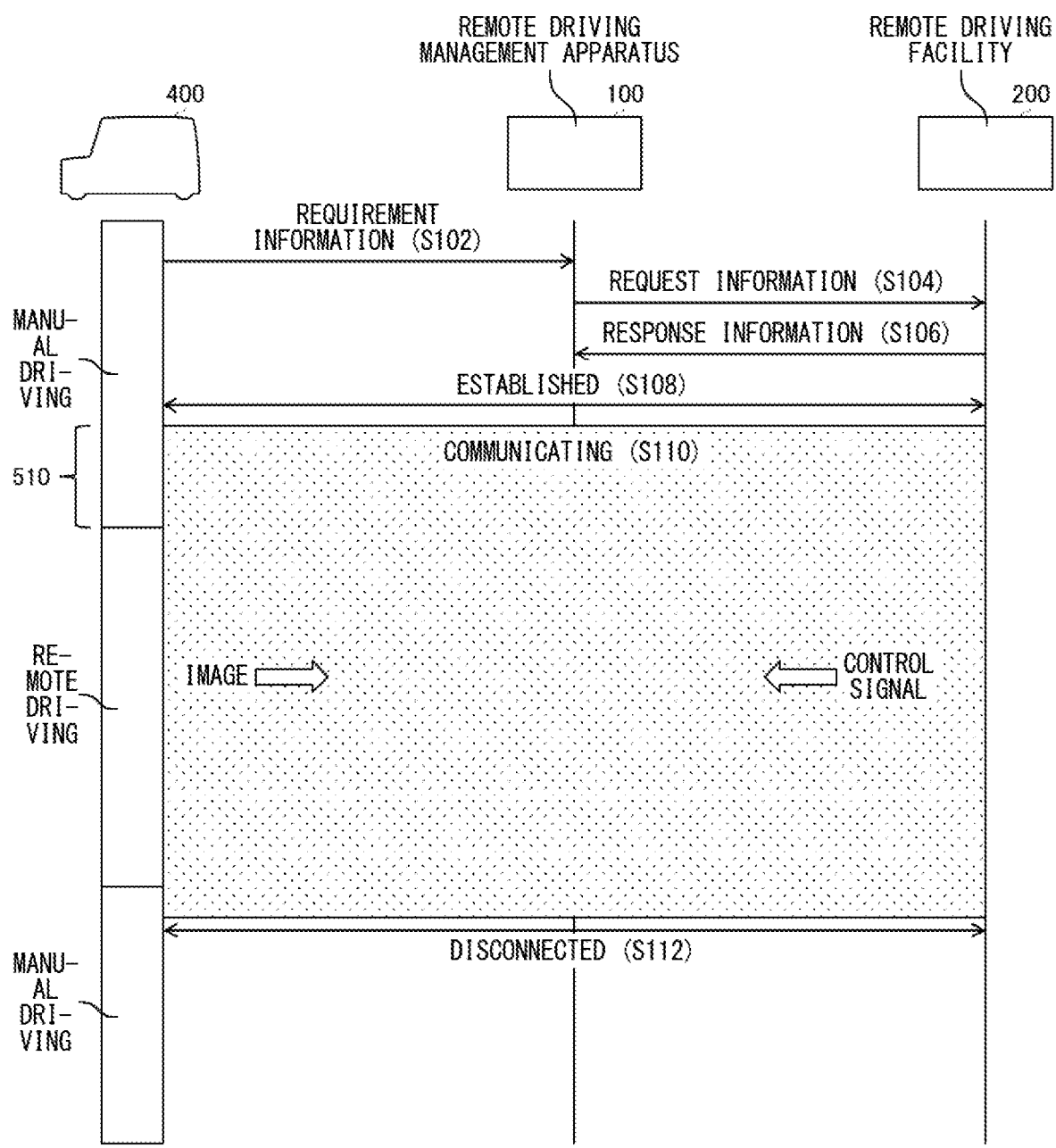
FIG. 5 schematically shows a processing flow of the remote driving system 10.

FIG. 5 schematically shows a processing flow of the remote driving system 10. Here, the processing flow when the occupant 40 of the vehicle 400 moves the vehicle 400 by manual driving on a path to a destination and when the occupant 40 moves the vehicle 400 by remote driving on a partial section of the path is schematically described.

In step (the term "step" may be abbreviated to S) 102, the vehicle 400 sends the requirement information to the remote driving management apparatus 100 according to an instruction of the occupant 40. The requirement information may include section information that indicates a travelling section on which the remote driving of the vehicle 400 is desired, and location information that indicates the location of the vehicle 400.

The remote driving management apparatus 100 determines the remote driving apparatus to remotely drive the vehicle 400 based on the received requirement information. For example, first, the remote driving management apparatus 100 estimates a time point at which the vehicle 400 reaches a starting point of the travelling section and a time point at which the vehicle 400 reaches an ending point of the travelling section from the section information and the location information included in the requirement information. Note that the vehicle 400 may also estimate the time point at which the vehicle 400 reaches the starting point of the travelling section and the time point at which the vehicle 400 reaches the ending point of the travelling section and notify the remote driving management apparatus 100 of the estimated time points.

Next, the remote driving management apparatus 100 refers to the registration data of the remote drivers and determines a remote driver who is to remotely drive the vehicle 400 based on the remote-driving permissible time of the plurality of remote drivers. Next, the remote driving management apparatus 100 identifies a time point traced back by a predetermined comparison period 510 from the time point at which the vehicle 400 reaches the starting point of the travelling section, and sends request information to request for the remote driving from the time point to a remote driving apparatus corresponding to the determined remote driver (S104). The length of the comparison period 510 may be able to be arbitrarily set, and also, may be changeable. FIG. 5 shows a case where the remote driving apparatus is the remote driving facility 200.

The remote driving facility 200 sends, to the remote driving management apparatus 100, response information that indicates whether the remote driving is permissible or not according to an instruction of the remote driver (S106). Here, the following continues the description of a case where the response information that indicates that the remote driving is permissible is sent.

The remote driving management apparatus 100 establishes a connection between the vehicle 400 and the remote driving facility 200 in response to the reception of the response information (S108). Then, the communication between the vehicle 400 and the remote driving facility 200 starts. The vehicle 400 sends an image acquired by the image acquiring unit 420 to the remote driving facility 200. The remote driving facility 200 sends a control signal based on the remote driving to the vehicle 400.

While controlling the vehicle 400 according to a control signal based on the manual driving, the vehicle controller 402 compares the control signal to the control signal based on the remote driving received from the remote driving facility 200. Here, the following continues the description of a case where the comparison result satisfies a predetermined condition. The vehicle controller 402 causes the vehicle 400 to enter the remote driving mode as the comparison period 510 ends. Note that when the comparison result satisfies a predetermined condition, the vehicle controller 402 may also cause the vehicle 400 to enter the remote driving mode without waiting for the end of the comparison period 510. After the vehicle 400 enters the remote driving mode, the vehicle controller 402 controls the vehicle 400 according to the control signal based on the remote driving.

The vehicle controller 402 causes the occupant 40 to start to manipulate the manipulating unit of the vehicle 400 before the vehicle 400 reaches the ending point of the travelling section. The vehicle controller 402 urges, by a display output and an audio output, for example, the occupant 40 to start to manipulate the manipulating unit.

While controlling the vehicle 400 according to a control signal based on the remote driving, the vehicle controller 402 compares the control signal to a control signal based on the manual driving to the manipulating unit of the vehicle 400. When the comparison result satisfies a predetermined condition, the vehicle controller 402 causes the vehicle 400 to enter the manual driving mode.

Then, the vehicle controller 402 disconnects the communication connection with the remote driving facility 200 (S112).

Although FIG. 5 shows a case where the control signal based on the remote driving is compared to the control signal based on the manual driving even when the vehicle 400 enters the manual driving mode from the remote driving mode, the comparison may not be performed. For example, after urging, by the display output and the audio output, the occupant 40 to start to manipulate the manipulating unit, the vehicle controller 402 may cause the vehicle 400 to exit the remote driving mode and enter the manual driving mode in response to started acquisition of the control signal based on the manual driving.

Even when the vehicle 400 enters the remote driving mode from the automated driving mode, the processing may be performed by a similar flow to that of FIG. 5. Also, the vehicle controller 402 may start generation of the control signal based on the automated driving before the vehicle 400 reaches the ending point of the travelling section, and cause the vehicle 400 to exit the remote driving mode and enter the automated driving mode as the vehicle 400 reaches the ending point of the travelling section.

Figure 6:
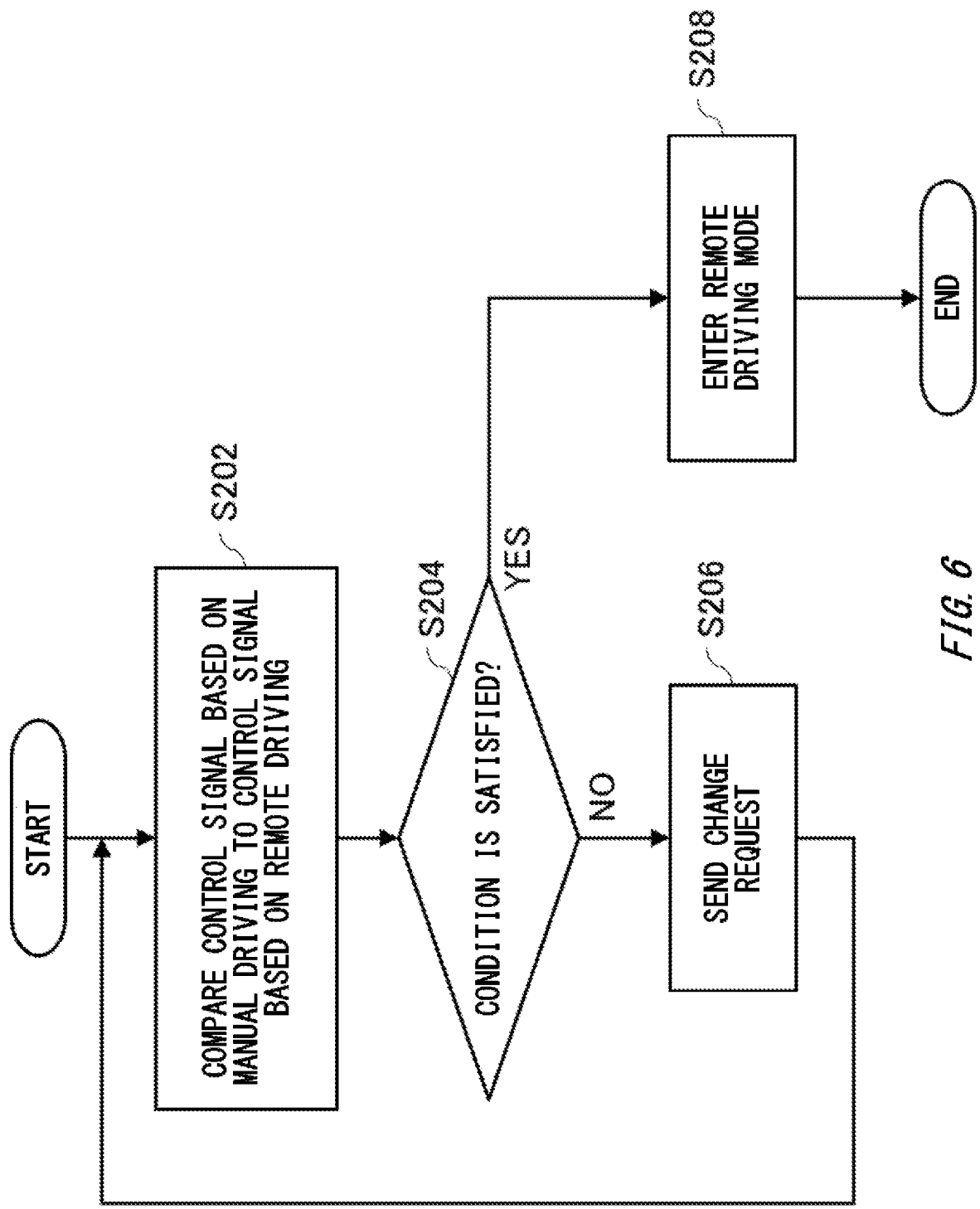
FIG. 6 schematically shows one example of a processing flow of a vehicle controller 402.

FIG. 6 schematically shows one example of a processing flow by the vehicle controller 402. Here, the processing flow of the vehicle controller 402 during the comparison period 510 is described.

In S202, the vehicle controller 402 compares the control signal based on the manual driving to the control signal based on the remote driving. In S204, the vehicle controller 402 determines whether or not the comparison result obtained in S202 satisfies a predetermined condition. If it is determined that the comparison result does not satisfy the predetermined condition, the step advances to S206, and if it is determined that comparison result satisfies the predetermined condition, the step advances to S208.

In S206, the vehicle controller 402 sends a remote driver change request to the remote driving management apparatus 100. When receiving the change request, the remote driving management apparatus 100 determines another remote driver, and establish the connection between the vehicle 400 and a remote driving apparatus corresponding to the remote driver through transmission of the request information and reception of the response information. Then, the step returns to S202. The vehicle controller 402 compares the control signal based on the manual driving to a control signal based on the remote driving by a new remote driver.

In S208, the vehicle controller 402 causes the vehicle 400 to enter the remote driving mode. The vehicle controller 402 controls the vehicle 400 according to the control signal based on the remote driving. According to the processing shown in FIG. 6, a remote driver who has a similar driving style to that of the occupant 40 can perform the remote driving on the vehicle 400.

Figure 7:
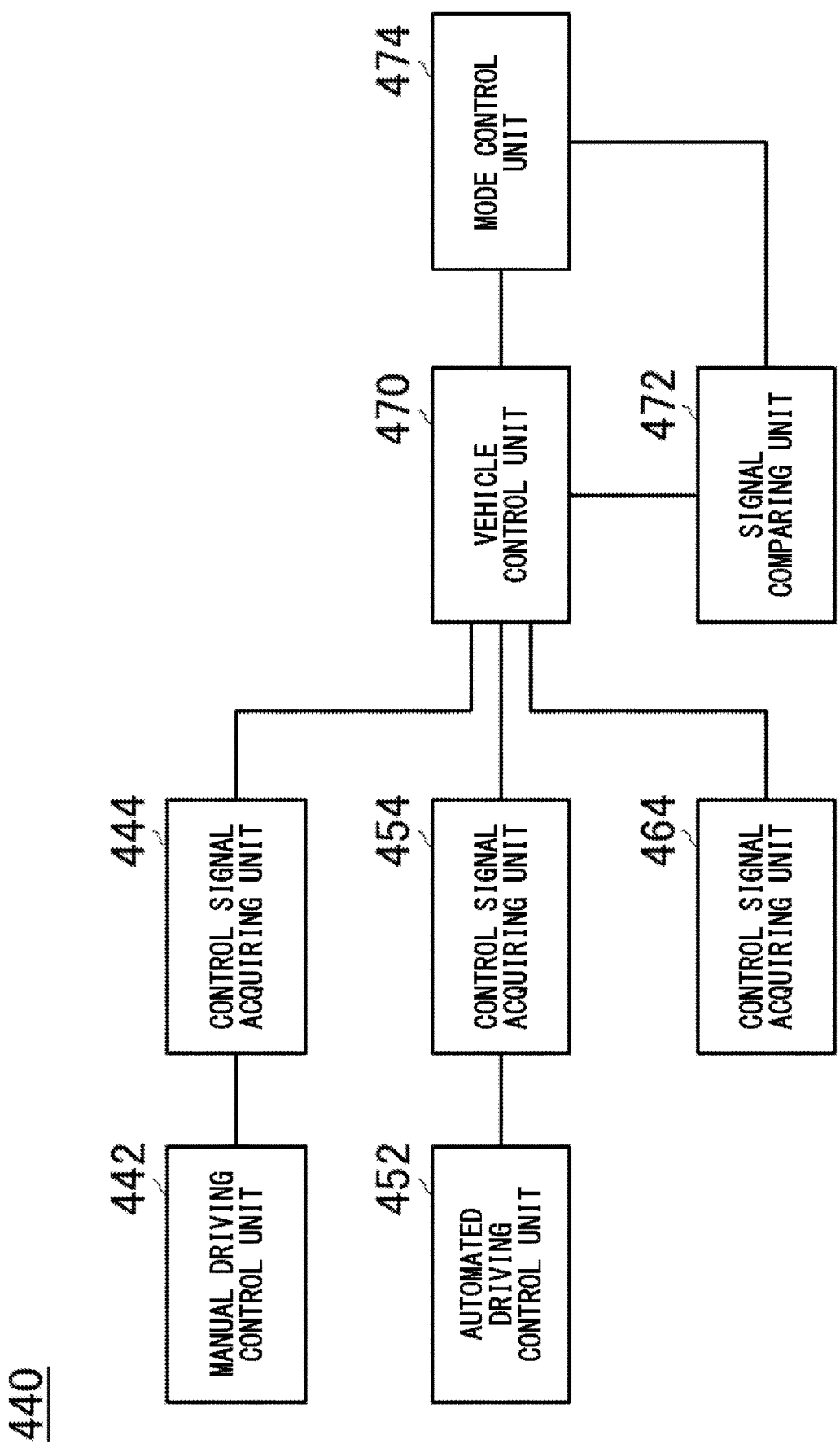
FIG. 7 schematically shows one example of a functional configuration of a control unit 440.

FIG. 7 schematically shows one example of a functional configuration of the control unit 440. The control unit 440 includes a manual driving control unit 442, a control signal acquiring unit 444, an automated driving control unit 452, a control signal acquiring unit 454, a control signal acquiring unit 464, a vehicle control unit 470, a signal comparing unit 472 and a mode control unit 474. Note that the control unit 440 does not necessarily include all of these components.

The manual driving control unit 442 controls the manual driving of the vehicle 400. The manual driving control unit 442 generates a control signal based on the manipulation contents acquired by the manipulation contents acquiring unit 410. The control signal acquiring unit 444 acquires the control signal generated by the manual driving control unit 442 and outputs the control signal to the vehicle control unit 470. The control signal acquiring unit 444 may be one example of a first control signal acquiring unit. The control signal acquired by the control signal acquiring unit 444 may be one example of a first control signal.

The automated driving control unit 452 controls the automated driving of the vehicle 400. The automated driving control unit 452 generates the control signal by using the location acquired by a location acquiring unit that is not shown in the drawing, information received from the object recognizing unit 418 and first map information, for example. The control signal acquiring unit 454 acquires a control signal generated by the automated driving control unit 452 and outputs the control signal to the vehicle control unit 470. The control signal acquiring unit 454 may be one example of a first control signal acquiring unit. The control signal acquired by the control signal acquiring unit 454 may be one example of the first control signal.

The control signal acquiring unit 464 acquires the control signal based on the remote driving. The control signal acquiring unit 464 acquires a control signal received by the wireless communication unit 430 from the remote driving facility 200 or the remote driving vehicle 300 and outputs the control signal to the vehicle control unit 470. The control signal acquiring unit 464 may be one example of a second control signal acquiring unit. The control signal acquired by the control signal acquiring unit 464 may be one example of a second control signal.

The vehicle control unit 470 controls the vehicle 400. When the vehicle 400 is in the manual driving mode, the vehicle control unit 470 controls the vehicle 400 according to a control signal received from the control signal acquiring unit 444. When the vehicle 400 is in the automated driving mode, the vehicle control unit 470 controls the vehicle 400 according to a control signal received from the control signal acquiring unit 454. When the vehicle 400 is in the remotely driven mode, the vehicle control unit 470 controls the vehicle 400 according to a control signal received from the control signal acquiring unit 464.

The signal comparing unit 472 compares the first control signal to the second control signal acquired by the control signal acquiring unit 464 while the vehicle 400 is in the first driving mode and while the vehicle control unit 470 is controlling the vehicle 400 according to the first control signal. For example, while the vehicle 400 is in the manual driving mode and while the vehicle control unit 470 is controlling the vehicle 400 according to a control signal acquired by the control signal acquiring unit 444, the signal comparing unit 472 compares the control signal to a control signal acquired by the control signal acquiring unit 464. Also, for example, while the vehicle 400 is in the automated driving mode and while the vehicle control unit 470 is controlling the vehicle 400 according to a control signal acquired by the control signal acquiring unit 454, the signal comparing unit 472 compares the control signal to a control signal acquired by the control signal acquiring unit 464.

The signal comparing unit 472 compares a time-series change amount of a steering angle of steering included in the first control signal to a time-series change amount of the steering angle of steering included in the second control signal, for example. Also, for example, the signal comparing unit 472 compares a time-series change amount of a stepping operation amount of an accelerator pedal included in the first control signal to a time-series change amount of a stepping operation amount of the accelerator pedal included in the second control signal. Also, the signal comparing unit 472 compares a time-series change amount of a stepping operation amount of a brake pedal included in the first control signal to a time-series change amount of a stepping operation amount of the brake pedal included in the second control signal, for example.

When the comparison result by the signal comparing unit 472 satisfies a predetermined condition, the mode control unit 474 causes the vehicle 400 to exit the first driving mode and enter the second driving mode. For example, when a degree of similarity between the first control signal and the second control signal is higher than a predetermined threshold, the mode control unit 474 causes the vehicle 400 to exit the first driving mode and enter the second driving mode. The threshold may be able to be arbitrarily set, and also, may be changeable.

Also, for example, when a degree of difference between the first control signal and the second control signal is lower than a predetermined threshold, the mode control unit 474 causes the vehicle 400 to exit the first driving mode and enter the second driving mode. The threshold may be able to be arbitrarily set, and also, may be changeable.

The signal comparing unit 472 may also compare the second control signal to the first control signal acquired by the control signal acquiring unit 444 or the control signal acquiring unit 454 while the vehicle 400 is in the second driving mode and while the vehicle control unit 470 is controlling the vehicle 400 according to the second control signal. For example, while the vehicle 400 is in the remote driving mode and while the vehicle control unit 470 is controlling the vehicle 400 according to a control signal acquired by the control signal acquiring unit 464, the signal comparing unit 472 compares the control signal to a control signal acquired by the control signal acquiring unit 444. Also, for example, while the vehicle 400 is in the remote driving mode and while the vehicle control unit 470 is controlling the vehicle 400 according to a control signal acquired by the control signal acquiring unit 464, the signal comparing unit 472 compares the control signal to a control signal acquired by the control signal acquiring unit 454. In this case, when the comparison result by the signal comparing unit 472 satisfies a predetermined condition, the mode control unit 474 may cause the vehicle 400 to exit the second driving mode and enter the first driving mode.

Figure 8:
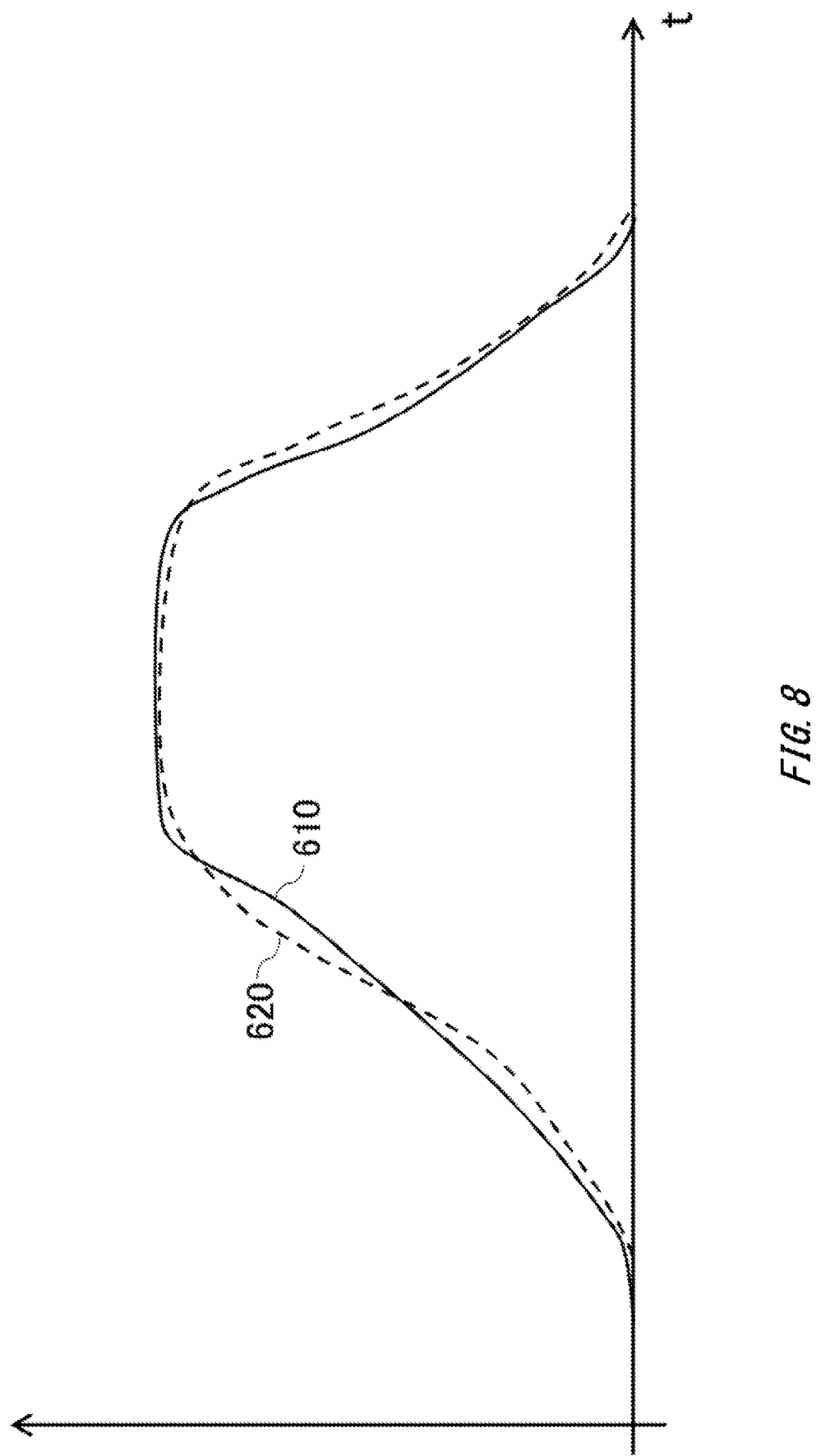
FIG. 8 schematically shows one example of a time-series change amount of a stepping operation amount of a brake pedal.
Figure 9:
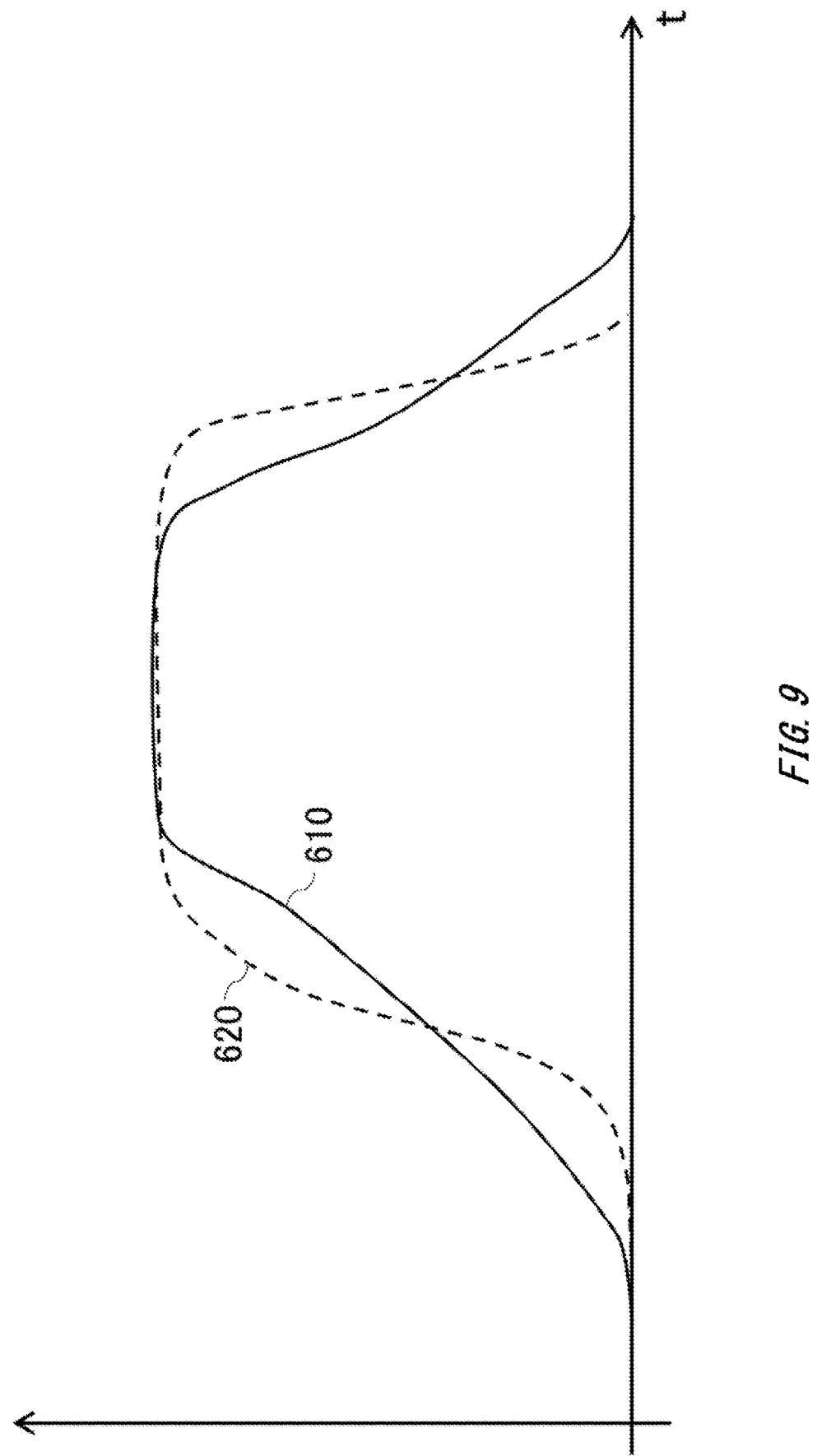
FIG. 9 schematically shows one example of a time-series change amount of a stepping operation amount of a brake pedal.

FIG. 8 and FIG. 9 schematically show examples of the time-series change amount of the stepping operation amount of the brake pedal. A change amount 610 indicates the change amount of the stepping operation amount of the brake pedal based on the manual driving. A change amount 620 indicates the change amount of the stepping operation amount of the brake pedal based on the remote driving.

Compared to the example shown in FIG. 9, the example shown in FIG. 8 shows a higher degree of similarity between the change amount 610 and the change amount 620, and also, shows a lower degree of difference between the change amount 610 and the change amount 620. For example, when the time-series change amount of the stepping operation amount of the brake pedal included in the control signal based on the manual driving and the time-series change amount of the stepping operation amount of the brake pedal included in the control signal based on the remote driving are respectively the change amount 610 and the change amount 620 exemplified in FIG. 8, the mode control unit 474 determines that the condition is satisfied, and when the said time-series change amounts are respectively the change amount 610 and the change amount 620 exemplified in FIG. 9, the mode control unit 474 determines that the condition is not satisfied. Accordingly, regarding the deceleration of the vehicle 400, the possibility that the occupant 40 feels discomfort can be reduced.

Figure 10:
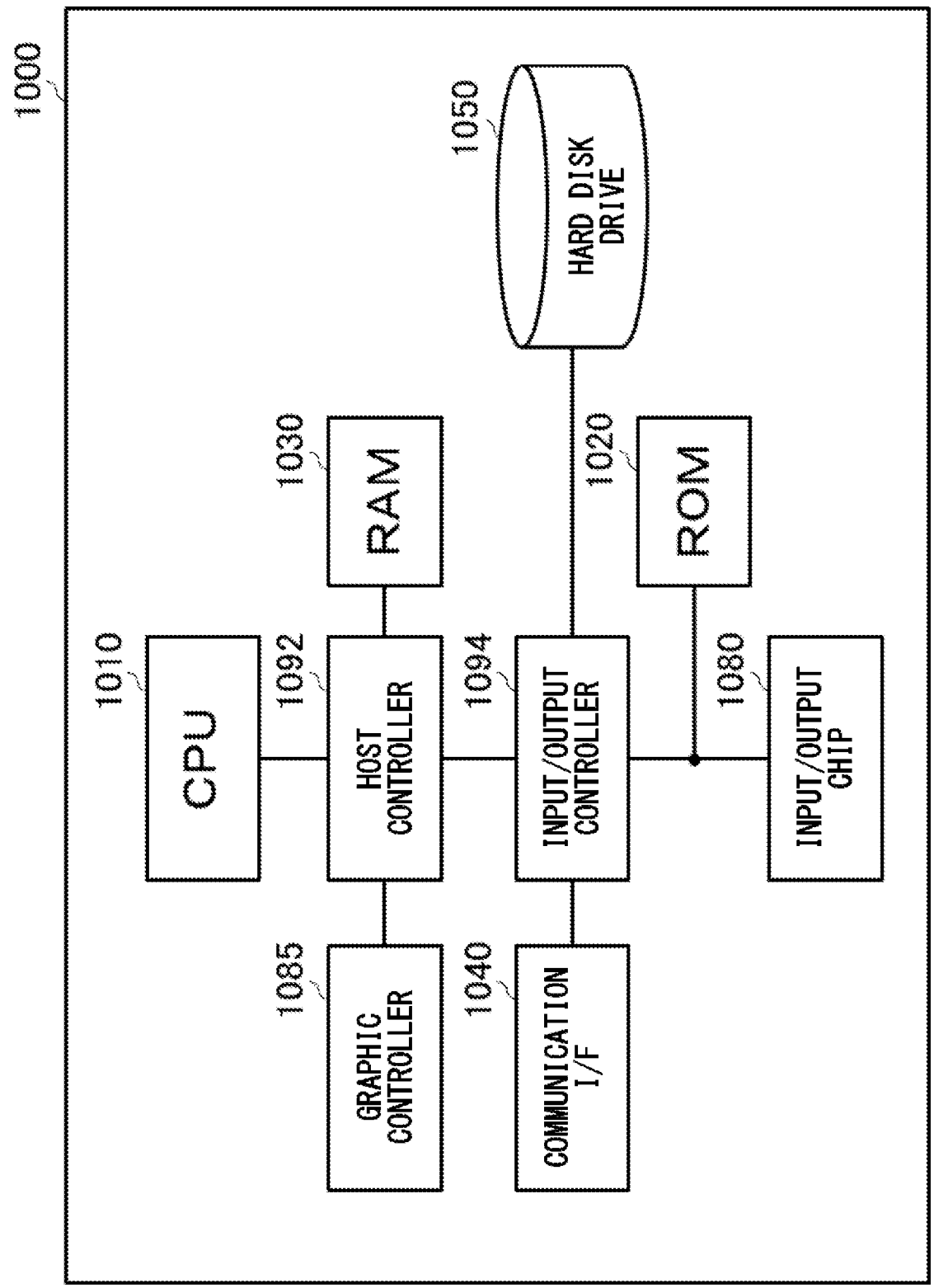
FIG. 10 schematically shows one example of a computer 1000 that functions as the control unit 440.

FIG. 10 schematically shows one example of a hardware configuration of a computer 1000 that functions as the control unit 440. The computer 1000 according to the present embodiment includes a CPU peripheral unit having a CPU 1010, a RAM 1030 and a graphic controller 1085 that are mutually connected by a host controller 1092, and an input/output unit having a ROM 1020, a communication I/F 1040, a hard disk drive 1050 and an input/output chip 1080 that are connected to the host controller 1092 by an input/output controller 1094.

The CPU 1010 operates based on programs stored in the ROM 1020 and the RAM 1030 to perform controlling on each unit. The graphic controller 1085 acquires image data generated by the CPU 1010 and the like on a frame buffer provided within the RAM 1030, and displays the image data on a display. Instead of this, the graphic controller 1085 may also include the frame buffer that stores the image data generated by the CPU 1010 and the like therein.

The communication I/F 1040 communicates with another apparatus via a wired or wireless network. Also, the communication I/F 1040 functions as hardware performing communications. The hard disk drive 1050 stores programs and data that are used by the CPU 1010.

The ROM 1020 stores a boot program that is executed when the computer 1000 runs, and a program and the like depending on the hardware of the computer 1000. The input/output chip 1080 connects various input/output devices to the input/output controller 1094 via a parallel port, a serial port, a keyboard port, a mouse port and the like, for example.

A program provided to the hard disk drive 1050 via the RAM 1030 is stored in a recording medium such as an IC card and is provided to a user. The program is read from the recording medium, installed in the hard disk drive 1050 via the RAM 1030, and executed on the CPU 1010.

A program that is installed in the computer 1000 and that causes the computer 1000 to function as the control unit 440 may work on the CPU 1010 and the like to cause the computer 1000 to respectively function as each unit of the control unit 440. the information processing described in these programs function, by being read by the computer 1000, as the manual driving control unit 442, the control signal acquiring unit 444, the automated driving control unit 452, the control signal acquiring unit 454, the control signal acquiring unit 464, the vehicle control unit 470, the signal comparing unit 472 and the mode control unit 474 that are specific means on which software and the above-described various hardware resources cooperate with each other. Then, by implementing, by these specific means, an information operation or processing in accordance with a purpose of use of the computer 1000 in the present embodiment, a specific control unit 440 in accordance with the purpose of use is constructed.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 . . . remote driving system; 12 . . . remote driving management center; 20 . . . driver; 30 . . . driver; 40 . . . occupant; 80 . . . network; 100 . . . remote driving management apparatus; 200 . . . remote driving facility; 214 . . . steering wheel; 216 . . . pedal; 230 . . . communication unit; 240 . . . display unit; 250 . . . control unit; 300 . . . remote driving vehicle; 302 . . . manipulation contents acquiring unit; 310 . . . vehicle control unit; 330 . . . wireless communication unit; 340 . . . display control unit; 400 . . . vehicle; 402 . . . vehicle controller; 410 . . . manipulation contents acquiring unit; 412 . . . image capturing unit; 414 . . . radar apparatus; 416 . . . LIDAR; 418 . . . object recognizing unit; 420 . . . image acquiring unit; 430 . . . wireless communication unit; 440 control unit; 442 . . . manual driving control unit; 444 . . . control signal acquiring unit; 452 . . . automated driving control unit; 454 . . . control signal acquiring unit; 464 . . . control signal acquiring unit; 470 . . . vehicle control unit; 472 . . . signal comparing unit; 474 . . . mode control unit; 510 . . . comparison period; 610 . . . change amount; 620 . . . change amount; 1000 . . . computer; 1010 . . . CPU; 1020 . . . ROM; 1030 . . . RAM; 1040 . . . communication I/F; 1050 . . . hard disk drive; 1080 . . . input/output chip; 1085 . . . graphic controller; 1092 . . . host controller; 1094 . . . input/output controller

What is claimed is:

1. A vehicle controller that controls a vehicle having a first driving mode in which the vehicle travels according to a first control signal based on manual driving or automated driving, and a second driving mode in which the vehicle travels according to a second control signal based on remote driving, the vehicle controller comprising:
a computer;
a first control signal acquiring unit that is configured to use the computer to acquire the first control signal;
a second control signal acquiring unit that is configured to use the computer to acquire the second control signal;
a vehicle control unit that is configured to use the computer to control the vehicle according to the first control signal when the vehicle is in the first driving mode, and controls the vehicle according to the second control signal when the vehicle is in the second driving mode;
a signal comparing unit that is configured to use the computer to compare, to the first control signal, the second control signal acquired by the second control signal acquiring unit while the vehicle is in the first driving mode and while the vehicle control unit is controlling travelling of the vehicle according to the first control signal; and
a mode control unit that is configured to use the computer to cause the vehicle to exit the first driving mode and enter the second driving mode when a comparison result by the signal comparing unit satisfies a predetermined condition in a comparison period, and
when the predetermined condition is satisfied in the comparison period, causes the vehicle to exit the first driving mode and enter the second driving mode, without waiting for an end of the comparison period.

2. The vehicle controller according to claim 1, wherein the mode control unit is configured to use the computer to cause the vehicle to exit the first driving mode and enter the second driving mode when a degree of similarity between the second control signal and the first control signal is higher than a predetermined threshold.

3. The vehicle controller according to claim 1, wherein the mode control unit is configured to use the computer to cause the vehicle to exit the first driving mode and enter the second driving mode when a degree of difference between the second control signal and the first control signal is lower than a predetermined threshold.

4. The vehicle controller according to claim 1, wherein the signal comparing unit is configured to use the computer to compare a time-series change amount of a steering angle that is included in the first control signal to a time-series change amount of a steering angle that is included in the second control signal.

5. The vehicle controller according to claim 4, wherein the signal comparing unit is configured to use the computer to compare the time-series change amount of the steering angle and a time-series change amount of a stepping operation amount of an accelerator pedal that are included in the first control signal to the time-series change amount of the steering angle and a time-series change amount of a stepping operation amount of the accelerator pedal that are included in the second control signal.

6. The vehicle controller according to claim 5, wherein the signal comparing unit is configured to use the computer to compare the time-series change amount of the steering angle, the time-series change amount of the stepping operation amount of the accelerator pedal and a time-series change amount of a stepping operation amount of a brake pedal that are included in the first control signal to the time-series change amount of the steering angle, the time-series change amount of the stepping operation amount of the accelerator pedal and a time-series change amount of a stepping operation amount of the brake pedal that are included in the second control signal.

7. The vehicle controller according to claim 4, wherein the signal comparing unit is configured to use the computer to compare the time-series change amount of the steering angle and a time-series change amount of a stepping operation amount of a brake pedal that are included in the first control signal to the time-series change amount of the steering angle and a time-series change amount of a stepping operation amount of the brake pedal that are included in the second control signal.

8. The vehicle controller according to claim 1, wherein the signal comparing unit is configured to use the computer to compare a time-series change amount of a stepping operation amount of an accelerator pedal that is included in the first control signal to a time-series change amount of a stepping operation amount of the accelerator pedal that is included in the second control signal.

9. The vehicle controller according to claim 1, wherein the signal comparing unit is configured to use the computer to compare a time-series change amount of a stepping operation amount of a brake pedal that is included in the first control signal to a time-series change amount of a stepping operation amount of a brake pedal that is included in the second control signal.

10. The vehicle controller according to claim 1, wherein the signal comparing unit is configured to use the computer to compare, to the second control signal, the first control signal acquired by the first control signal acquiring unit while the vehicle is in the second driving mode and while the vehicle control unit is controlling the travelling of the vehicle according to the second control signal, and
the mode control unit is configured to use the computer to cause the vehicle to exit the second driving mode and enter the first driving mode when a comparison result by the signal comparing unit satisfies a predetermined condition.

11. The vehicle controller according to claim 1, wherein when the predetermined condition is not satisfied in the comparison period, a change of the second control signal is requested.

12. A non-transitory computer-readable storage medium that stores a program thereon, the program causing a computer included in a vehicle having a first driving mode in which the vehicle travels according to a first control signal based on manual driving or automated driving, and a second driving mode in which the vehicle travels according to a second control signal based on remote driving to function as:
a signal comparing unit that compares, to the first control signal, the second control signal acquired by a vehicle control unit while the vehicle is in the first driving mode and while the vehicle control unit is controlling travelling of the vehicle according to the first control signal, the vehicle control unit controlling the vehicle according to the first control signal when the vehicle is in the first driving mode and controlling the vehicle according to the second control signal when the vehicle is in the second driving mode; and
a mode control unit that causes the vehicle to exit the first driving mode and enter the second driving mode when a comparison result by the signal comparing unit satisfies a predetermined condition in a comparison period, and
when the predetermined condition is satisfied in the comparison period, causes the vehicle to exit the first driving mode and enter the second driving mode, without waiting for an end of the comparison period.

13. The non-transitory computer-readable storage medium according to claim 12, wherein
the mode control unit causes the vehicle to exit the first driving mode and enter the second driving mode when a degree of similarity between the second control signal and the first control signal is higher than a predetermined threshold.

14. The non-transitory computer-readable storage medium according to claim 12,
wherein the mode control unit causes the vehicle to exit the first driving mode and enter the second driving mode when a degree of difference between the second control signal and the first control signal is lower than a predetermined threshold.

15. The non-transitory computer-readable storage medium according to claim 12, wherein
the signal comparing unit compares a time-series change amount of a steering angle that is included in the first control signal to a time-series change amount of a steering angle that is included in the second control signal.

16. The non-transitory computer-readable storage medium according to claim 12, wherein the signal comparing unit compares a time-series change amount of a stepping operation amount of an accelerator pedal that is included in the first control signal to a time-series change amount of a stepping operation amount of the accelerator pedal that is included in the second control signal.

17. The non-transitory computer-readable storage medium according to claim 12,
wherein the signal comparing unit compares a time-series change amount of a stepping operation amount of a brake pedal that is included in the first control signal to a time-series change amount of a stepping operation amount of the brake pedal that is included in the second control signal.

18. The non-transitory computer-readable storage medium according to claim 12, wherein
the signal comparing unit compares, to the second control signal, the first control signal acquired while the vehicle is in the second driving mode and while the vehicle control unit is controlling the travelling of the vehicle according to the second control signal, and
the mode control unit causes the vehicle to exit the second driving mode and enter the first driving mode when a comparison result by the signal comparing unit satisfies a predetermined condition.

19. The non-transitory computer-readable storage medium according to claim 12, wherein when the predetermined condition is not satisfied in the comparison period, a change of the second control signal is requested.

\* \* \* \* \*